United States Patent [19]
De Crouy-Chanel et al.

[11] Patent Number: 6,131,018
[45] Date of Patent: Oct. 10, 2000

[54] TELEPHONY DEVICE COMPRISING AN ACCUMULATION DEVICE AND ACCUMULATION DEVICE SUITABLE FOR SUCH A TELEPHONY DEVICE

[75] Inventors: Rémy De Crouy-Chanel; Sylvain Venant, both of Le Mans, France

[73] Assignee: U.S. Philips Corporation, New York, N.Y.

[21] Appl. No.: 09/123,730

[22] Filed: Jul. 28, 1998

[30] Foreign Application Priority Data

Oct. 28, 1997 [FR] France ................................. 9713508

[51] Int. Cl.⁷ ................. H04B 1/38; H02N 6/00
[52] U.S. Cl. ................. 455/90; 455/572; 455/573; 320/101; 136/244
[58] Field of Search ............... 455/90, 572, 573; 136/257, 259, 244, 245, 246, 291, 608; 320/108, 114, 110, 101; D14/137, 138; 307/48, 66

[56] References Cited

U.S. PATENT DOCUMENTS

| | | | |
|---|---|---|---|
| 4,017,725 | 4/1977 | Roen | 361/680 |
| 5,012,220 | 4/1991 | Miller | 340/311.1 |
| 5,039,928 | 8/1991 | Nishi et al. | 320/101 |
| 5,210,804 | 5/1993 | Schmid | 381/323 |
| 5,243,578 | 9/1993 | Mathez | 368/88 |
| 5,522,943 | 6/1996 | Spencer et al. | 136/245 |
| 5,701,067 | 12/1997 | Kaji et al. | 320/101 |
| 5,898,932 | 4/1999 | Zurlo | 455/573 |

FOREIGN PATENT DOCUMENTS

| | | | |
|---|---|---|---|
| 88136981 | 2/1989 | Germany | G01G 23/00 |
| 9302460 | 5/1993 | Germany | H05K 5/02 |
| 19521135 | 11/1996 | Germany . | |

*Primary Examiner*—William G. Trost
*Assistant Examiner*—Erika A. Gary
*Attorney, Agent, or Firm*—Dicran Halajian

[57] ABSTRACT

This electrical apparatus comprising a removable accumulation device (10) coupled to a photovoltaic cell device (20) has a front. The light-sensitive face of the photovoltaic cell device (20) is oriented to the same side as said front.

4 Claims, 3 Drawing Sheets

TELEPHONY DEVICE COMPRISING AN ACCUMULATION DEVICE AND ACCUMULATION DEVICE SUITABLE FOR SUCH A TELEPHONY DEVICE

FIELD OF THE INVENTION

The invention relates to an electrical apparatus having a front and comprising a removable accumulation device coupled to a photovoltaic cell device that has a light-sensitive face.

The invention relates to an accumulation device suitable for such apparatus.

The invention finds interesting applications in all cordless telephony devices, for example, telephony devices that comply with the DECT standard, GSM or also the DCS 1800 standard, and so on. With the aid of these cells it is possible to increase significantly the life expectancy of accumulation devices which feed these cordless telephony devices.

BACKGROUND OF THE INVENTION

German patent no. DE 195 21 135 describes such a telephony device. This telephony device comprises a certain number of photovoltaic cell modules which are connected to the casing of the device.

Sometimes, the presence of these cells is found troublesome and cumbersome whereas the presence may be unnecessary.

SUMMARY OF THE INVENTION

The invention proposes an apparatus of the type defined in the opening paragraph for which it is possible to either or not combine photoelectric cells therewith.

For this purpose, such an apparatus is characterized in that said sensitive face is oriented to the same side as said front.

Thus, according to the invention, the user will be able to change in a simple fashion the accumulation device: either take a normal device that does not comprise a photovoltaic cell device or take one that does.

Another advantage is that the photovoltaic cell device ensures its function when the user manipulates the keyboard or examines the display of his telephony device because in that case the sensitive face is oriented to light.

Furthermore, it is interesting to sell an accumulation device comprising such a photovoltaic cell device separately.

BRIEF DESCRIPTION OF THE DRAWINGS

These and other aspects of the invention will be apparent from and elucidated with reference to the embodiments described hereinafter.

In the drawings.

DETAILED DESCRIPTION OF THE INVENTION

Figure 1:
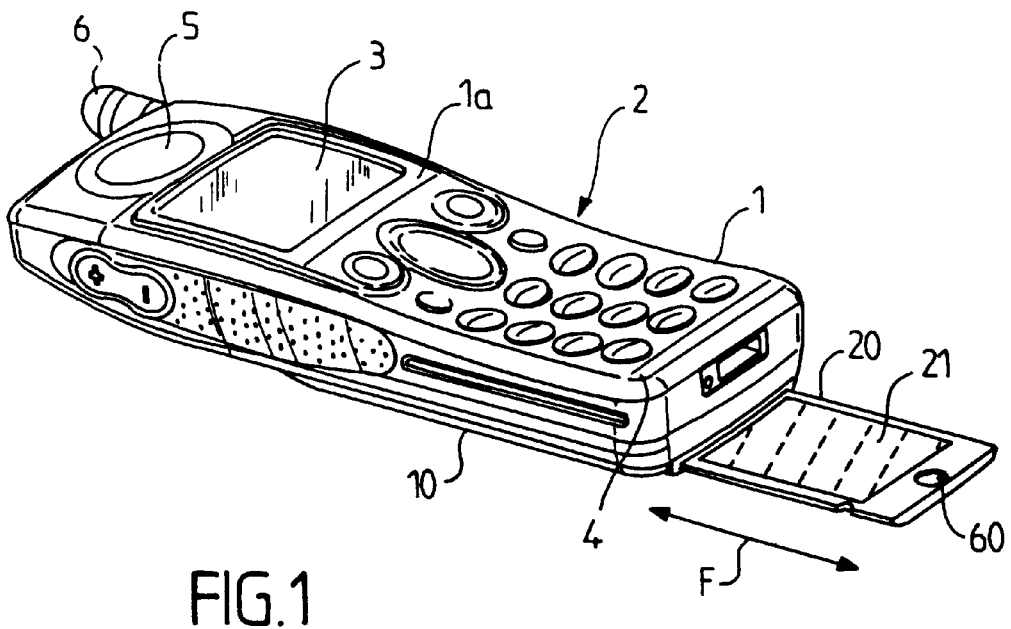
FIG. 1 shows a front view of a telephony device in accordance with the invention.

In FIG. 1, the apparatus that is represented is a telephony device used, for example, for a GSM system. It will be obvious that the invention relates to any other sort of electrical apparatus needing an accumulator. The device of FIG. 1 is formed by a casing 1 which has a front 1a on which are situated a keyboard 2, a display 3, a microphone 4 and an earphone 5. This device also includes an antenna 6. This device makes it necessary to use an accumulation device 10 which is partly seen in this Figure, to ensure a certain autonomy for the telephony device in that these electrical and electronic circuits which are shown in this Figure are supplied with power. For maintaining a prolonged charged state, a maintenance current or even a recharging current coming from a photovoltaic cell 20 can be supplied to this telephony device. The active surface of this cell is hatched in broken lines. The photovoltaic cell device 20 is mechanically integral with the accumulation device 10.

According to the invention, the active or sensitive face 21 of the cell device 20 which receives the light is oriented to the same side as the front of the apparatus.

Figure 2:
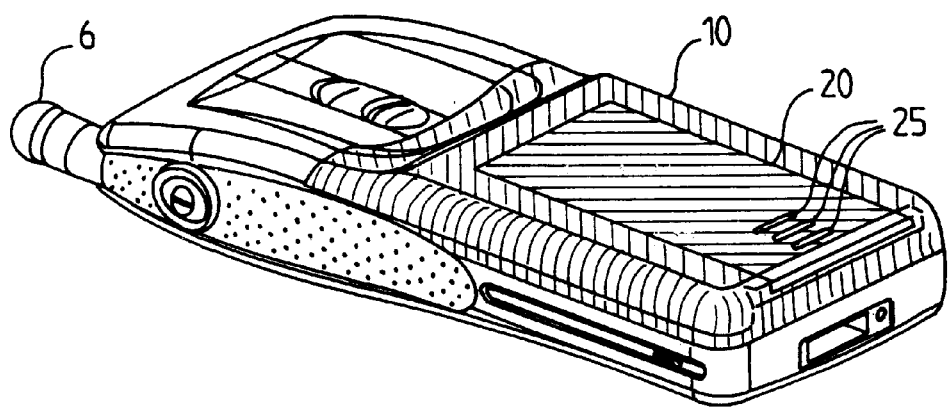
FIG. 2 shows a back view of the telephony device shown in FIG. 1.

According to the preferred embodiment the cell device 20 has the form of a drawer. The drawer is represented in open position in FIG. 1. In FIG. 2 which shows the telephony device in a back view, the drawer is shown in closed position. In this FIG. 2 the accumulation device 10 is represented as a hatched cell. Slots 25 make it possible for the user to take and slide the device 20 with his/her finger as a drawer in the directions of the arrow F, to put it in open or closed position, respectively.

Figure 3:
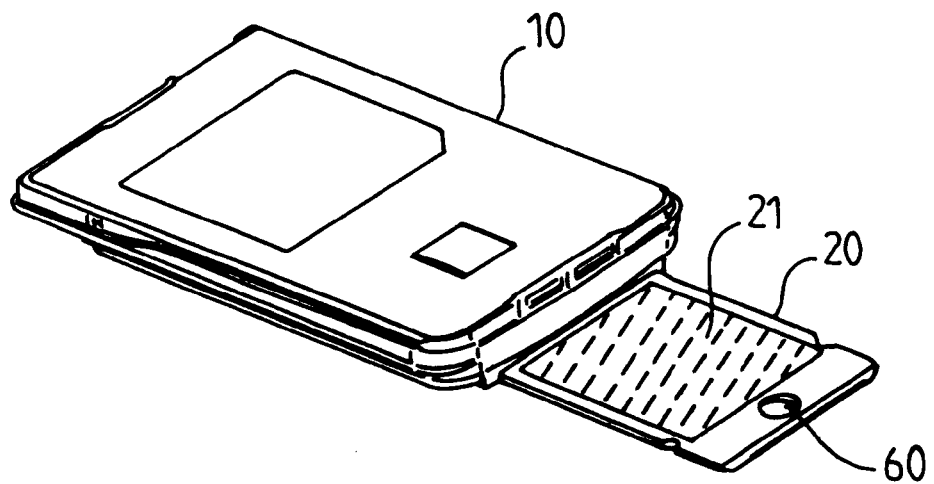
FIG. 3 shows an accumulation device according to the invention.
Figure 4:
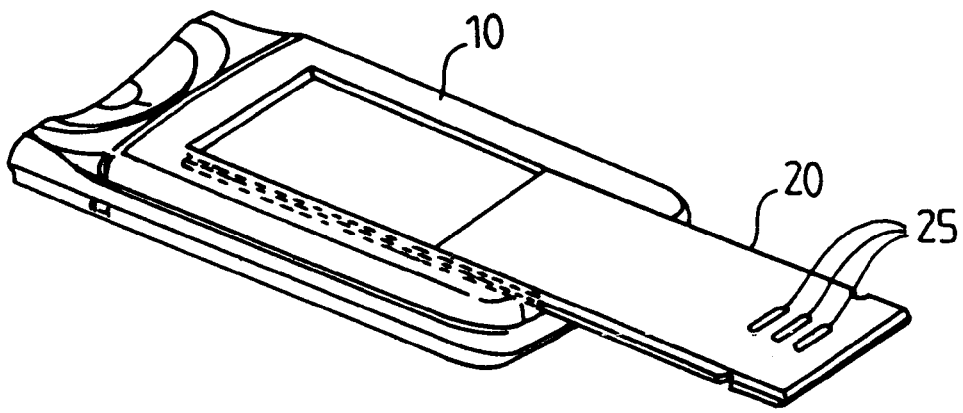
FIG. 4 shows a back view of the accumulation device shown in FIG. 3.

FIGS. 3 and 4 show the accumulation device separately from the telephony device.

Figure 5:
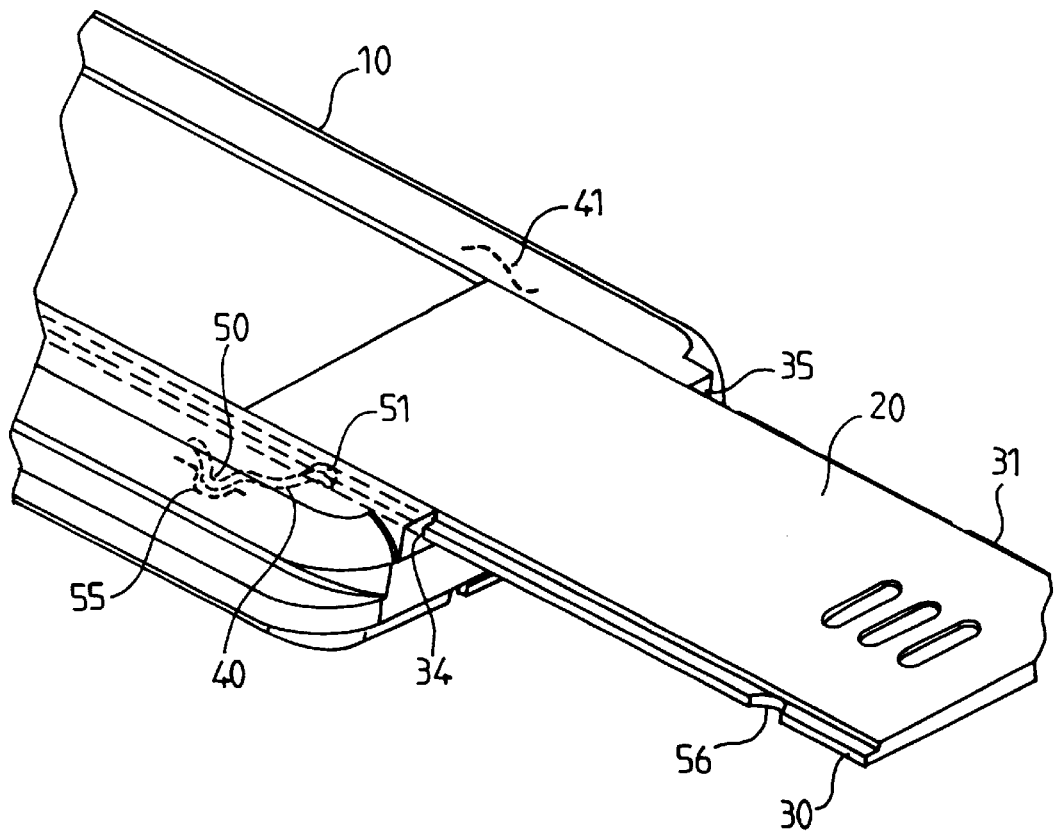
FIG. 5 shows in more detail the embodiment of the accumulation device shown in the previous Figure.

FIG. 5 shows in detail how the electrical contacts between the photovoltaic cell device and the power supply device on the one hand, and the drawer-like displacement of the photovoltaic cell device on the other. On the side walls of the device 20 are provided on either one of the two sides sliding members 30 and 31 which penetrate into guides 34 and 35 and which have a conducting part. Only guide 34 is visible in the Figure. Each guide accommodates a contact leaf spring 40 and 41, only the leaf spring, 40 is visible in a dashed line. The contact leaf spring 40 has two protrusions 50 and 51 intended to be accommodated in two cavities 55 and 56, respectively. Thus, when the cell device 20 is in closed position, the protrusion 51 penetrates into cavity 56 maintaining the cell device 20 in this closed position. As the side walls are conductive, the contact leaf springs 40 and 41 ensure the electrical contact of cell device 20 with the telephony device 30.

According to an interesting aspect of the invention, the drawer may have a place 60 for accommodating an electroacoustic transducer, a microphone or an earphone.

This place is referenced in the FIGS. 1 and 3.

What is claimed is:

1. An electrical apparatus having a front and comprising a removable accumulation device coupled to a photovoltaic cell device that has a light-sensitive face, wherein said light-sensitive face is oriented to a same side as said front and said photovoltaic cell device is arranged in a drawer on the removable accumulation device, said drawer sliding along sliding members of the drawer, wherein electrical contacts between the photovoltaic cell device and the removable accumulation device are ensured by conductor lines arranged on the sliding members of the drawer.

2. An electrical apparatus having a front and comprising a removable accumulation device coupled to a photovoltaic cell device that has a light-sensitive face, wherein said light-sensitive face is oriented to a same side as said front, said photovoltaic cell device having a place for accommodating an electroacoustic transducer.

3. An accumulation device suitable for an electrical apparatus having a front, said accumulation device having a photovoltaic cell device which is installed in a drawer-like manner on the accumulation device sliding along sliding members, wherein electrical contacts between the photovoltaic cell device and the accumulation device are ensured by conductor lines disposed on the sliding members of the drawer.

4. An accumulation device suitable for an electrical apparatus having a front, said accumulation device having a photovoltaic cell device that has a light-sensitive face, wherein said light-sensitive face is oriented to a same side as said front, and wherein the photovoltaic cell device has a place for accommodating an electroacoustic transducer.

* * * * *